(No Model.)
W. VANDERCOOK.
TWO WHEELED VEHICLE.
No. 297,543. Patented Apr. 22, 1884.
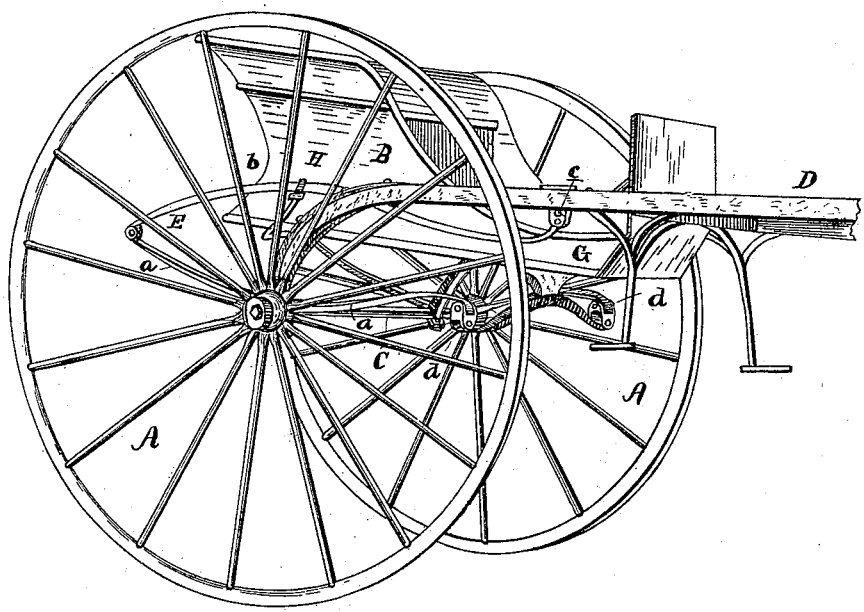
WITNESSES:
W. T. Robertson
E. H. Bond.
INVENTOR
Willis Vandercook.
BY T. W. Robertson
ATTORNEY.
N. PETERS, Photo-Lithographer, Washington, D. C.

UNITED STATES PATENT OFFICE.

WILLIS VANDERCOOK, OF MASON, MICHIGAN.

TWO-WHEELED VEHICLE.

SPECIFICATION forming part of Letters Patent No. 297,543, dated April 22, 1884.

Application filed August 8, 1883. (No model.)

*To all whom it may concern:*

Be it known that I, WILLIS VANDERCOOK, of Mason, in the county of Ingham and State of Michigan, have invented new and useful Improvements in Springs for Two-Wheeled Vehicles; and I do hereby declare that the following is a full, clear, and exact description thereof, reference being had to the accompanying drawing, which forms a part of this specification.

This invention relates to certain new and useful improvements in the construction of springs for two-wheeled vehicles.

The invention consists in the peculiar construction, arrangement, and various combinations of the parts, all as more fully hereinafter set forth.

In the accompanying drawing my invention is shown in perspective, forming the running-gear of a cart, and in which A represents the wheels, C the axle, B the body, and D the shafts, of any of the known constructions.

E represents the side springs, which are formed of two half-elliptic springs, joined together at one end, but open at the other. The lower members of these springs, $a$, are properly clipped to the axle, their forward ends being connected together at $d$ by a cross-spring, F, the latter being connected to the body B by means of the spring-block G and suitable bolts. The forward end of the upper part, $b$, of the springs E is adjustably secured to the shafts D by means of the shackles of clips $c$ in any such a manner as will permit of an adjustment of that end of the member $b$ of the spring. The rear portion of the body is supported upon a cross-bar, H, the ends of which are secured to the springs E. In some forms of bodies it will be necessary to jack up or down, so as to bring the body upon the proper plane, though the form of such bar forms no part of my invention. By this manner of mounting the body of a cart upon its springs I construct a vehicle that is as easy in all its movements as though it were mounted upon four wheels.

What I claim as my invention is—

1. A spring for two-wheeled vehicles, consisting of the side springs, E, having their top sections, $b$, connected to the shafts and their lower sections connected to the cross-spring F, and bar H, when constructed, arranged, and operating substantially as and for the purposes set forth.

2. In combination with the wheels A, axle C, body B, and shafts D, the springs E, having their top sections connected to the shafts and their lower sections connected to the cross-spring F, and cross-bar H, when constructed, arranged, and operating substantially as and for the purposes specified.

WILLIS VANDERCOOK.

Witnesses:
 H. S. SPRAGUE,
 E. SCULLY.